Aug. 10, 1926.  
G. M. EATON  
1,595,763  
FLEXIBLE GEAR  
Filed Dec. 29, 1923

WITNESSES:  
R. S. Harrison  
W. B. Jaspert

INVENTOR  
George M. Eaton  
BY  
Wesley J. Carr  
ATTORNEY

Patented Aug. 10, 1926.

1,595,763

UNITED STATES PATENT OFFICE.

GEORGE M. EATON, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE GEAR.

Application filed December 29, 1923. Serial No. 683,369.

My invention relates to flexible gear elements, more especially to gear-wheels designed to permit axial misalinement of the supporting hub structure and the toothed gear rim.

It is among the objects of my invention to provide a gear-wheel structure embodying a spherically movable hub member and a plurality of radial spring members which shall be of simple, compact and durable mechanical construction, which shall have a resilient connection between the outer working rim and the supporting hub member to permit angular displacement of the toothed rim relative to the hub and which shall be adapted to provide relative spherical movement of the rim and hub members.

It is a further object of my invention to provide a flexible gear element in which the flexible member comprises an integral structure having radially extending leaf spring members for transmitting torque.

Various types of flexible gear elements have been proposed that utilize radial spring structures, such as spring spokes or spring nests built up of a plurality of leaf springs of various lengths, in which the base of the spring units is secured in the hub structure and the projecting spring members in slotted openings that are provided in the rim, with various types of side constructions functioning as retaining members for the spring elements.

My present invention is directed to a flexible gear element in which the rim portion is shrunk on a plurality of spiders that are adapted to seat on a central supporting hub; and flexible elements that are practically integral with a cage ring are disposed in the spider portion of the rim in a manner to permit movement therewithin. The extending portion of the spring elements engages a slotted central flange portion of the hub, and the spider is provided with integral or removable lugs or fingers that are transversely disposed to effect engagement with the spring elements. The structure is designed to transmit the load from the fingers or the spider through the spring elements to the slotted flange of the hub, as hereinafter more fully set forth.

Figure 1:
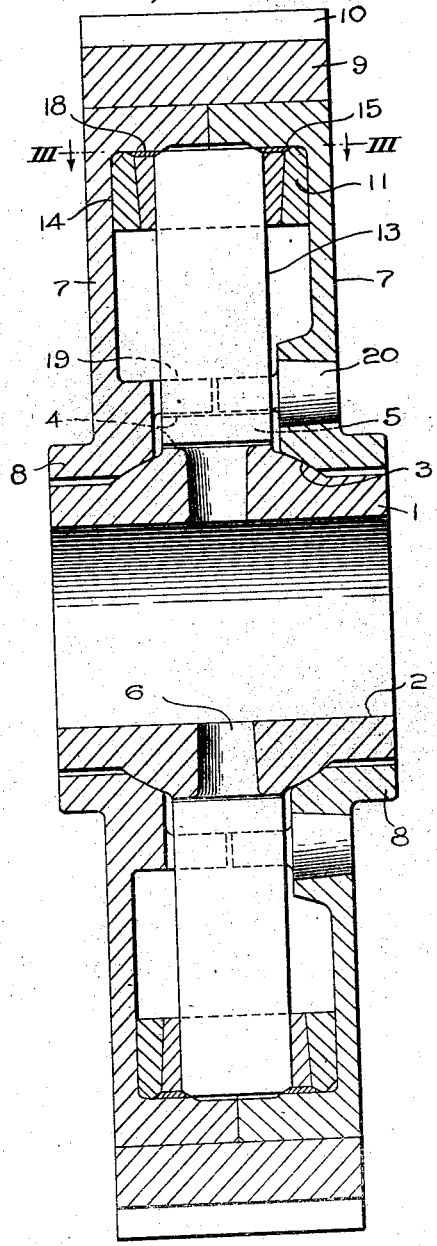
Figure 2:
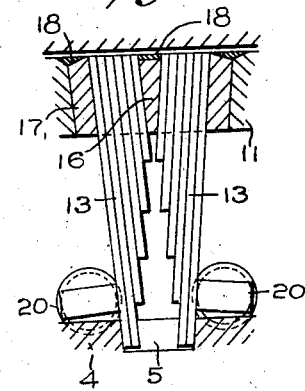
Figure 3:
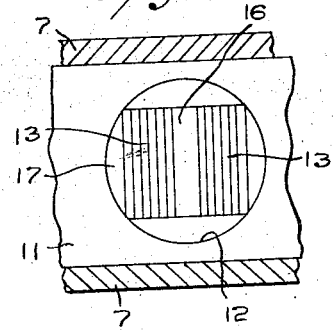

In the accompanying drawing constituting a part hereof, and in which like reference characters designate like parts, Figure 1 is a view, partially in section and partially in elevation, of a gear element embodying the principles of my invention, Fig. 2 is a similar view of a fragmentary portion of the spring element, showing the engagement thereof with the hub and rim members, and Fig. 3 is a cross-sectional view thereof taken along the line III—III of Fig. 1.

Referring to Fig. 1, the structure herein illustrated comprises a hub member 1 having a central opening 2 and a substantially spherically-shaped or curved seating portion 3. The hub is provided with a central circumferential rim or flange 4 having slotted openings 5 (Figs. 1 and 2) and with radial openings 6 to lighten the hub structure and to facilitate lubrication. A plurality of side-plates or spiders 7, having an inner flange portion 8 that is formed complementary to the spherically-curved surface 3 of the hub 1, are mounted on the latter and are joined by a gear rim 9, having a toothed outer periphery 10, by means of a shrink fit on the side-plates or in any other suitable manner.

A flexible element comprising a cage ring 11, having cylindrical openings 12 therein and having a plurality of leaf springs 13 secured in said openings, is disposed between the side members 7 and is adapted to move angularly therewithin, the ring member 11 having a shiver fit at its engaging sides 14 and its outer periphery 15.

The springs 13 are disposed substantially parallel to the axis of the hub 1, as shown in Figs. 2 and 3, and are secured in the cage ring 11 by spacer blocks 16 and a plurality of segment wedges 17. The spring elements, wedges and ring are further secured by welding along the outer periphery of the ring, as indicated at 18 in Figs. 1 and 2, the ring and springs thus constituting a unitary structure.

The radially extending leaf springs 13 (Fig. 2) are disposed in the slotted openings 5 of the flange 4 of the hub, while the spiders 7 are provided with integral projecting fingers 19 or insert fingers 20 to engage the spring elements 13. Either of the fingers 19 or 20 may be satisfactorily utilized, but I prefer to employ the insert fingers 20, as they have the advantage of being alinable with the inclined outer faces of the spring leaves, as shown in Fig. 2.

The operation of this gear element is briefly as follows. Referring to Fig. 2, the cage ring 11, having a shiver fit with the gear rim and spiders, is adapted to permit angular displacement which, however, is restricted by the contact of the fingers 20 with the projected spring elements 13, for either direction of rotation. The movement of the hub 1 relative to the ring member 11 is restricted by the engagement of the springs 13 with the slotted flange 4. From this, it is obvious that torque transmitted from the hub 1 to the rim 11 will be carried through the spring element to the fingers 20 on the one or the other side of the spring members, depending upon the direction of rotation of the hub member, and, in a similar manner, torque transmitted from the rim to the hub will be carried by the spring elements from the fingers to the sides of the slotted openings in the hub member 1.

The seat of the spider 7 on the hub member 1 is a shiver fit for the purpose of permitting relative spherical motion of the spider on the hub member, which permits relative misalinement of the axes of the hub and rim members.

This is particularly advantageous in connection gear trains having relatively movable drive shaft members, where the latter are journalled in independent supports having relative functions involving movement and displacement of the respective supporting members.

It is evident from the above description of my invention that flexible gear elements made in accordance therewith will provide simple, durable and efficient driving connections that are especially advantageous as driving mechanisms for electrical railway vehicles, where the drive motor and wheel axles are subjected to misalinement, impact and overload stresses.

Although I have described a specific embodiment of my invention, it will be obvious to those skilled in the art that various modifications may be made in the details of construction, such as the design and proportions of the several co-operating members, without departing from the principles herein set forth.

I claim as my invention:—

1. A flexible element comprising a cage ring having a plurality of spring nests mounted therein, and a plurality of wedges for securing said spring nests to said ring.

2. A flexible element comprising a cage ring having a plurality of spring nests mounted therein, and a plurality of wedges for securing said spring nests to said ring, said spring nests and ring being welded together.

3. A flexible element comprising a hub, a spider seated on said hub, a rim mounted upon said spider, a cage ring, having spring nests secured therein, disposed in said spider, and means for effecting engagement of said hub and spider with said spring members.

4. A flexible element comprising a hub, a spider seated on said hub, a gear rim mounted on said spider, a cage ring, a plurality of radially inwardly extending leaf springs disposed therein and means for effecting engagement of said hub and spider with said springs, said spider being spherically movable on said hub.

5. A flexible element comprising a hub, a spider seated on said hub, a gear rim mounted on said spider, a cage ring, a plurality of radially inwardly extending leaf springs disposed therein and means for effecting engagement of said hub and spider with said springs, said spider being spherically movable on said hub, and said cage ring being angularly movable in said spider.

6. A flexible element comprising a hub, a spider seated on said hub, a gear rim mounted on said spider, a cage ring having a plurality of angularly spaced openings, a plurality of radially inwardly extending leaf springs secured therein, and means for effecting engagement of said hub and spider with said springs, said spider being spherically movable on said hub.

7. A flexible element comprising a hub, a spider seated on said hub, a gear rim mounted on said spider, a cage ring having a plurality of angularly spaced openings, a plurality of radially inwardly extending leaf springs secured therein, said spider being spherically movable on said hub, and means on said spider and hub for engaging said spring members.

8. A flexible element comprising a hub having a spherical seating portion and a recessed peripheral flange, a spider adapted to seat on the spherical portion of said hub, a gear rim shrunk on said spider, a cage ring disposed in said spider, spring elements mounted in said ring, and projecting lugs on said spider for engaging said springs, the free ends of said springs being disposed in the recesses of said hub flange.

9. A flexible element comprising a hub having a spherical seating portion and a recessed circumferential flange, a spider adapted to seat on the spherical portion of said hub, a gear rim shrunk on said spider, a cage ring movably mounted in said spider, spring elements mounted in said ring, and projecting lugs on said spider for engaging said springs, the free ends of said springs being disposed in the recesses of said hub flange.

In testimony whereof, I have hereunto subscribed my name this 22nd day of December 1923.

GEORGE M. EATON.